2 Sheets—Sheet 2.

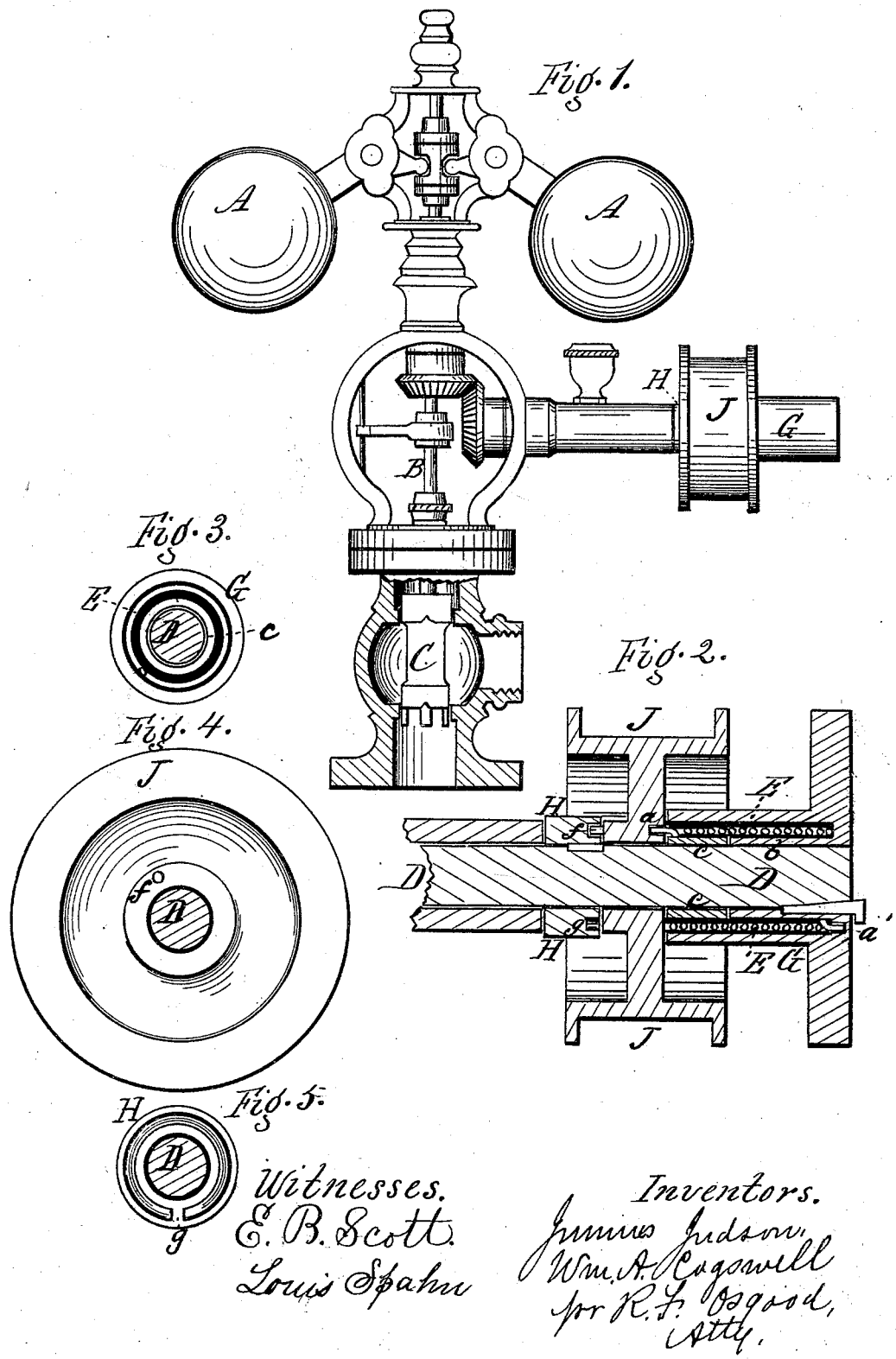

J. JUDSON & W. A. COGSWELL.
STEAM-GOVERNOR.

No. 169,815.  Patented Nov. 9, 1875.

Witnesses.
E. B. Scott.
Louis Spahn.

Inventors.
Junius Judson,
Wm. A. Cogswell,
per R. F. Osgood,
Atty.

UNITED STATES PATENT OFFICE.

JUNIUS JUDSON AND WILLIAM A. COGSWELL, OF ROCHESTER, NEW YORK.

IMPROVEMENT IN STEAM-GOVERNORS.

Specification forming part of Letters Patent No. 169,815, dated November 9, 1875; application filed October 9, 1874.

*To all whom it may concern:*

Be it known that we, JUNIUS JUDSON and WILLIAM A. COGSWELL, both of the city of Rochester, in the county of Monroe and State of New York, have invented a certain new and useful Improvement in Steam-Governors; and we do hereby declare that the following is a full, clear, and exact description of the construction and operation of the same, reference being had to the accompanying drawings, in which—

Figure 6:
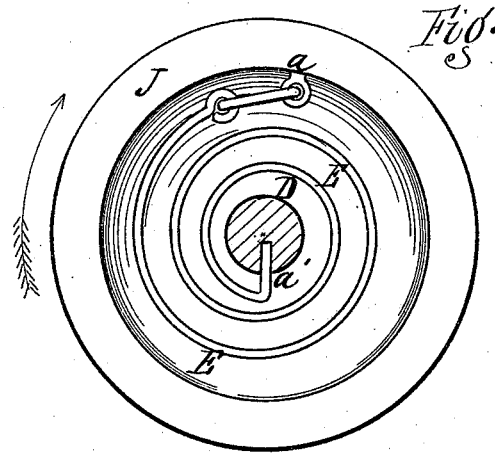
Figure 7:
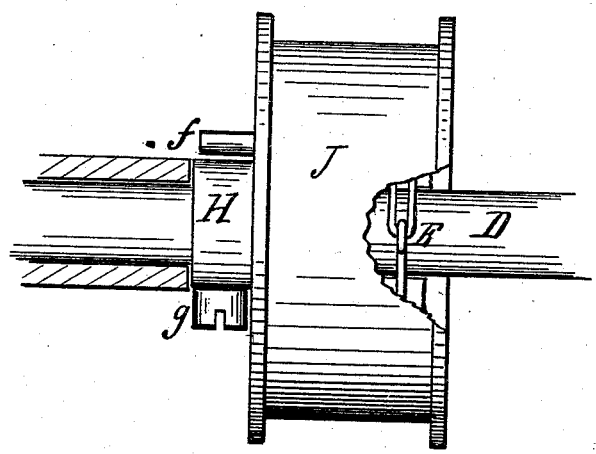

Figure 1 is an elevation. Fig. 2 is an enlarged section of the spring-pulley. Figs. 3, 4, and 5 are detail views, showing the several parts of Fig. 2. Figs. 6 and 7 are modifications of the spring-pulley.

The object of this invention is to prevent the transmission of the impulses or jerks of the engine from the driving-pulley to the governor, which impulses cause irregular and unequal action of the regulating valve or piston that admits steam to the cylinder. The steam acts spasmodically and unequally at each revolution of the engine, owing to the peculiarities of the crank motion; and a fly-wheel is usually employed to equalize the variations in power applied upon the piston in the cylinder, and to produce a uniform speed. The weight of fly-wheel used in steam-engines is often insufficient to do this, and the consequence is the fly-wheel is jerked at each revolution when the crank is at full leverage or at half-stroke. These jerks, although not perceptible to the eye, owing to the rapid revolution, cause the governor-balls to alternately rise and fall by corresponding impulses, and this action of the governor-balls is greatly exaggerated by the corresponding opening and closing of the regulating-valve in the governor, which is compelled to follow the impulses of the balls, thereby letting on and cutting off the steam spasmodically, when no such action should occur; but, on the contrary, the action should be regular and uniform. The consequence is that the steam is admitted to drive the cylinder-piston in a very imperfect manner, and the speed is not only uncertain, but great strain and concussion occur to the engine and to the frame-work.

It is the object of our improvement to obviate this difficulty; and the invention consists in combining with the driving-pulley of the governor, and with the shaft which transfers the power from the driving-pulley to the balls, a spring, which allows a free turning of the pulley on the shaft, to a certain extent, to counteract the jerks or impulses, and then resumes its normal position on the shaft when the impulse has passed. It also consists in the employment of a loose collar within the spring, which accommodates the rolling action of the spring, and prevents binding of the same on the shaft; and it furthermore consists of a stop arrangement, whereby, if the spring breaks at any time, the motion of the governor will be retained by the engagement of the pulley and shaft by means of the stop.

The drawings represent an ordinary Judson governor, in which A A are the balls, B is the valve-rod, and C is the regulating valve or piston, which admits steam to the cylinder. D is the governor-shaft, and J is the driving-pulley, with which our improvement is combined. In ordinary governors the driving-pulley J is made fast on the shaft D, and, therefore, the irregular impulses of the engine will be carried to the governor, as before described. In carrying out our invention, we fit the driving-pulley loosely on the shaft, so that it will turn free, and combine with the same a spring, E, one end of which is fast to the pulley, and the other to the shaft. The connection of the spring is such that, under ordinary action, motion will be given by the pulley to the shaft through the medium of the spring; but, if any quick impulse or jerk occurs, the spring will allow the pulley to turn free, and, in advance of the movement of the shaft, to the full extent of the spring. By this means the impulse is all expended upon the pulley, and is not carried to the shaft, and, hence, the impulse cannot reach the governor-balls, which revolve undisturbed in their proper plane; nor can it be carried to the regulating-valve which is connected with the governor-balls. The action of the regulating-valve in admitting steam to the cylinder is, therefore, regular and uniform, notwithstanding the motion of the engine itself may be irregular. This regularity in admitting the steam to the cylinder obviates, in a great degree, the irregularity of the engine itself, and largely prevents the concussion and strain upon the engine and supporting parts, which now occur from overcharging the cylinder by the vibrations or oscillations of the balls. The spring may be combined with the shaft and driving-pulley in various ways with the same result. We prefer the form shown in Fig. 2, in which a coiled spring is used resting in an annular groove of a collar, G, keyed to the shaft. One end, $a$, is connected with the pulley, and the other end, $a'$, with the collar. The spring acts by torsion. In Figs. 6 and 7 a simple coiled spring is shown, resting within the housing of the pulley, connected at one end to the shaft, and at the other to the rim of the pulley by a link connection, which allows freedom of motion. To make a right or left pulley the pulley is simply slipped from the shaft, and put on again the reverse way. The collar G has an interior bearing, $b$, which rests on the shaft. At the end of this, located within the spring and resting around the shaft, is a loose ring, $c$, which completes the length of the bearing $b$. This ring, while it prevents the contact of the spring with the shaft, allows the spring to turn, under torsion, and the ring rolls with it, to a certain extent, upon the shaft, thereby insuring free and easy action of the spring, and obviating the binding, which would occur if the spring came directly in contact with the shaft. At one end of the pulley is a collar, H, made fast to the shaft. This collar has a stop, $g$, and the pulley has a corresponding pin, $f$, projecting from its side, which overhangs or covers the stop. The object of this arrangement is to make an engagement between the pulley and shaft, if the spring should break, and thereby preserve the motion of the governor, and prevent the opening of the regulating-valve. In case the spring should break, or become disconnected, the pin $f$ would strike the stop $g$, and the motion of the shaft would be kept up. The spring, when in working order, does not allow the contact of the pin and stop, but preserves the engagement of the pulley and shaft by its own connection, irrespective of the stop arrangement.

We do not claim, broadly, the interposition of a spring between two parts to allow one part to turn in advance of the other; but

We claim—

1. In a steam-governor, the combination, with the counter-shaft D and pulley J, of a spring, E, connected at its ends, respectively, with the shaft and pulley, and operating in connection with the governor-balls A A and regulating-valve C, to prevent impulses or jerks on the pulley from being transmitted to the valve, said balls and valve being entirely independent of the spring in their governing action, as herein shown and described.

2. The combination, with the spring E, of the ring or collar $c$, resting within the spring and loosely upon the shaft, as and for the purpose specified.

3. The combination, with a governor, of the pulley J, spring E, shaft D, slot $g$, and pin $f$, constructed and operated substantially as described, for the purpose specified.

In witness whereof we have hereunto signed our names in the presence of two subscribing witnesses.

JUNIUS JUDSON.
W. A. COGSWELL.

Witnesses:
R. F. OSGOOD,
EDWIN B. SCOTT.